United States Patent [19]

Miura et al.

[11] Patent Number: 5,175,788
[45] Date of Patent: Dec. 29, 1992

[54] OPTICAL BEAM PROFILE TRANFORMING ELEMENT

[75] Inventors: Kazunori Miura, Atsugi; Ippei Sawaki, Sagamihari, both of Japan

[73] Assignee: Fujitsu Limited, Kawasaki, Japan

[21] Appl. No.: 679,198

[22] Filed: Apr. 2, 1991

[30] Foreign Application Priority Data

Apr. 4, 1990 [JP] Japan .................................. 2-89596

[51] Int. Cl.$^5$ ............................................... G02B 6/18
[52] U.S. Cl. ..................................... 385/131; 385/124
[58] Field of Search ............... 385/124, 125, 126, 130, 385/131, 132

[56] References Cited

U.S. PATENT DOCUMENTS

| | | | |
|---|---|---|---|
| 4,339,174 | 7/1982 | Levin | 385/124 X |
| 4,856,859 | 8/1989 | Imoto | 385/124 X |
| 4,871,221 | 10/1989 | Imoto | 385/130 |

FOREIGN PATENT DOCUMENTS

1-134309 5/1989 Japan .

Primary Examiner—John D. Lee
Assistant Examiner—Phan T. Heartne
Attorney, Agent, or Firm—Staas & Halsey

[57] ABSTRACT

An optical beam profile transforming element which is a monolith solid element with a low loss is provided by placing at least two parallel plastic wave guide layers in contact with each other, each of the at least two parallel plastic wave guide layers having a refractive index gradually varying in the direction of light propagation so that the at least two parallel plastic wave guide layers as a whole transform a profile of an optical beam in the direction vertical to the layers. The variation of the refractive index can be obtained by varying a concentration of a dopant in a matrix, and the variation of the concentration of a dopant in a matrix can be obtained by varying an irradiation amount of a combination of a matrix and a dopant monomer with an ultra-violet ray.

10 Claims, 6 Drawing Sheets

OPTICAL BEAM PROFILE TRANFORMING ELEMENT

BACKGROUND OF THE INVENTION

1. Filed of the Invention

The present invention relates to a light beam profile transforming element, and a process for manufacturing the element.

2. Description of the Related Art

Due to recent developments in optical fiber technologies, laser light sources and the like, optical communication and systems and devices to which an optics technology is applied are more widely used.

In particular, the optical interconnection technology between an optical element such as a light emitting element or a light-detecting element and an optical fiber, used in optical communication, is very critical to the level of propagation loss, i.e., the transmittable distance. Generally, the optical interconnection is made by inserting a micro-spherical lens between an optical fiber and an optical element, or by processing an end of an optical fiber to form a convex lens. Since these optical parts used for the optical interconnection are extremely small, the machining or processing, as well as handling, require great skill, and thus they are not satisfactory. Therefore, a monolith solid optical interconnection element is sought, from the viewpoint of a matching preciseness, machining or handling, and long term reliability, etc.

Figure 1:
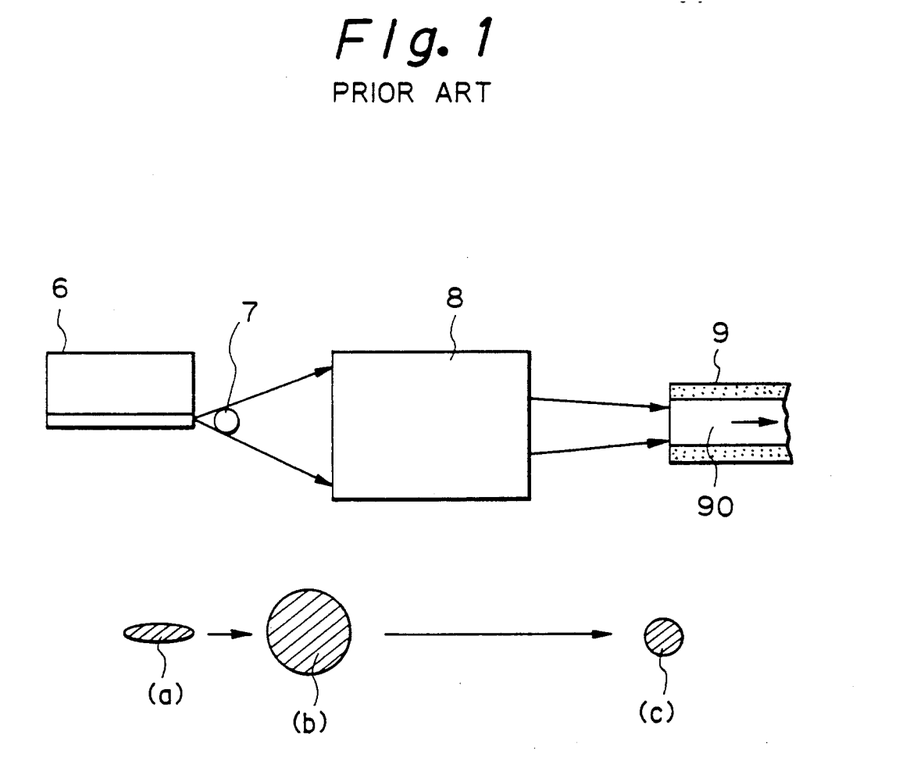
FIG. 1 shows a typical optical beam profile transforming assembly in the prior art.

FIG. 1 shows a typical optical beam profile transforming element of the prior art.

Generally, the beam profile of light emitted from a semiconductor laser is not circular but is elongated in the direction parallel to the active semiconductor layer, for example, an ellipse having a long diameter of about 4 $\mu$m and a short diameter of about 1.5 $\mu$m as shown by (a) in FIG. 1. On the other hand, the core of an optical fiber is circular in section. Therefore, if a semiconductor laser is connected directly to an optical fiber, the light is not transmitted with a satisfactory efficiency.

To solve the above problem, as shown in FIG. 1, a combination of a cylindrical lens 7 and a convergent rod lens is most often used. The cylindrical lens 7 first transforms the ellipse beam emitted from the semiconductor laser 6 to a circular beam (b) and the circular beam (b) is then transformed by the convergent rod lens 8 into a circular beam (c) having a diameter matching that of the core 90 of an optical fiber 9. This assembly has an advantage in that it can be composed of optical parts now in practical use, but has disadvantages such as the need for a large number of component parts including holders, and special skills required for the assembling, further, the time required for matching the axes of optical parts, etc.

Single-mode optical fibers recently used for a long distance optical communication have an outer diameter of about 125 $\mu$m and a core of at largest 10 $\mu$m in diameter. On the other hand, the above assembly of the prior art comprises a large number of component parts, and the axis matching between a semiconductor laser, lenses and an optical fiber must be precise to within a few micrometers. As a result, great skill, a number of costly parts, and too many steps are disadvantageously required.

SUMMARY OF THE INVENTION

To solve the above problems, in accordance with the present invention, there is provided an optical beam profile transforming element having a direction of light propagation, which comprises at least two parallel plastic wave guide layers in contact with each other, each of the at least two parallel plastic wave guide layers having a refractive index gradually varying in the direction of light propagation such that the at least two parallel plastic wave guide layers as a whole transform a profile of an optical beam in the direction vertical to the layers, during a light propagation through the element, more specifically an optical beam profile transforming element comprising at least first and second parallel plastic wave guide layers, the first parallel plastic wave guide layer having a first wave guide portion and a first clad portion, the second parallel plastic wave guide layer having a second wave guide portion and a second clad portion, the first and second wave guide portions being in contact with each other and composing a wave guide having a direction of light propagation, each of the first and second wave guide portions having a refractive index gradually varying in the direction of light propagation such that the first and second parallel plastic wave guide layers as a whole transform a profile of an optical beam in the direction vertical to the layers during a light propagation through the wave guide.

The gradually varying refractive index of each parallel core layer may be obtained by a matrix containing a dopant having a refractive index higher than that of the matrix, in a concentration varying from the first to second ends. The varying concentration of the dopant in the matrix may be obtained by forming a layer of a doping monomer with a matrix polymer and irradiating the layer with an ultra-violet ray to polymerize the monomer and form a doping polymer, the irradiation amount being varied from the first to second ends, removing the remaining monomer from the polymer matrix, and then finally curing the matrix polymer.

Also, there is provided a process for manufacturing an optical beam profile transforming element, comprising the steps of: forming a first wave guide forming layer on a substrate having first and second ends, the first wave guide forming layer comprising a matrix polymer and an optically curable doping monomer; irradiating a portion of the first wave guide forming layer with an ultra-violet ray to polymerize the doping monomer to a doping polymer having a refractive index higher than that of the matrix polymer and form a first wave guide layer, an irradiation amount of the ultra-violet ray being gradually varied from the first to second ends so that a concentration of the doping polymer and thus a refractive index of the first wave guide layer gradually vary from the first to second ends; forming a second wave guide forming layer on the first wave guide layer, the second wave guide forming layer comprising a matrix polymer and an optically curable doping monomer; and irradiating a portion of the second wave guide forming layer with an ultra-violet ray to polymerize the doping monomer to a doping polymer having a refractive index higher than that of the matrix polymer and to form a second wave guide layer, an irradiation amount of the ultra-violet ray being gradually varied form the first to second ends so that a concentration of the doping polymer, and thus a refractive index of the second wave guide layer, gradually vary from the first to second ends, whereby the first and second wave guide layers constitute an effective wave guide core layer gradually varying in a direction vertical to the layers between the first and second ends, so that the first and second wave guide layers as a whole transform a profile of an optical beam in the direction vertical to the layers during a light propagation of the optical beam through the wave guide.

In a preferred embodiment, the optical beam profile transforming element has an effective wave guide or core portion having a first thickness or a rectangular cross section at the first end and a second thickness thicker than the first thickness or a square cross section at the second end, whereby an ellipse beam entered a the first end is transformed and emitted as a circular beam at the second end.

DESCRIPTION OF THE PREFERRED EMBODIMENTS

As mentioned above, the refractive index of a plastic mass can be locally controlled by irradiating a polymer matrix having a certain refractive index mixed with an optically curable doping monomer with an ultra-violet ray, and varying the irradiation amount of the ultra-violet ray. When the optically curable doping monomer is irradiated with the ultra-violet ray, the monomer is polymerized to form a doping polymer having a refractive index typically higher than that of the matrix polymer. The amount of the formed doping polymer varies depending on the irradiation amount of the ultra-violet ray. Therefore, after irradiating the ultra-violet ray and removing the remaining doping monomer, the plastic mass comprising the polymer matrix and the doping polymer has a refractive index locally varying depending on the irradiation amount of the ultra-violet ray.

Figure 2:
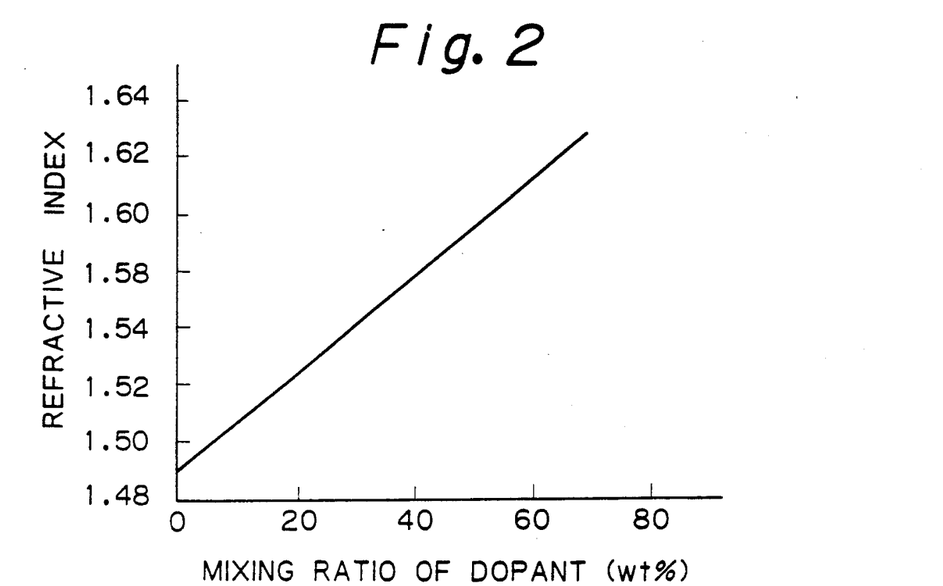
FIG. 2 shows a relationship between the refractive index and the mixing ratio of the dopant to the matrix.

FIG. 2 shows a relationship between the refractive index and the mixing ratio of a dopant in the layer. The matrix was an acrylic polymer containing a cross linking agent (e.g., "Optomer" provided by Nippon Synthetic Industries Ltd.) dissolved in Celfloacetate (ethylene-glycolethylacetate). Vinylcarbazole monomer $C_{12}H_8N\text{-}CH\text{:}CH_2$ as a dopant was mixed in the above solution and spin-coated on a silicon substrate to form a layer 5 μm thick which was then pre-baked at 60° C. for 30 minutes. The concentration of the vinylcarbazole monomer was varied from 0 to 70% by weight based on the weight. The coated layer was then irradiated with an ultra-violet ray at 13 mJ/s for 60 minutes to polymerize the monomer and form polyvinylcarbazole (PVCz) and the remaining vinylcabazole monomer was removed by immersing the layer in ethyl alcohol at room temperature. The layer was post baked at 150° C. for 30 minutes to cross link the matrix of acrylic polymer.

The refractive index of the thus formed layers was determined by the prism coupling method, i.c., by placing a prism on the post-baked layer, irradiating the layer with a laser beam having a wave length of 0.63 μm, and measuring the intensity of the reflecting light while varying the incident angle.

It is seen from FIG. 2 that the refractive index increases almost linearly from 1.49 when no dopant is mixed to 1.64 when 70% by weight of the dopant is mixed. 100% polymerized dopant, polyvinylcarbazole, has a refractive index of 1.67. Note, the difference of the refractive index can be made more than 0.1 by varying the concentration of the dopant within the layer. Further, it was confirmed that the composite layer formed within this mixing ratio range has properties that can be used as a wave guide. Thus, FIG. 2 shows that the refractive index can be controlled by varying the concentration of the dopant (vinylcarbazole) in the matrix (acrylic polymer) for forming a beam profile transforming wave guide.

Figure 3:
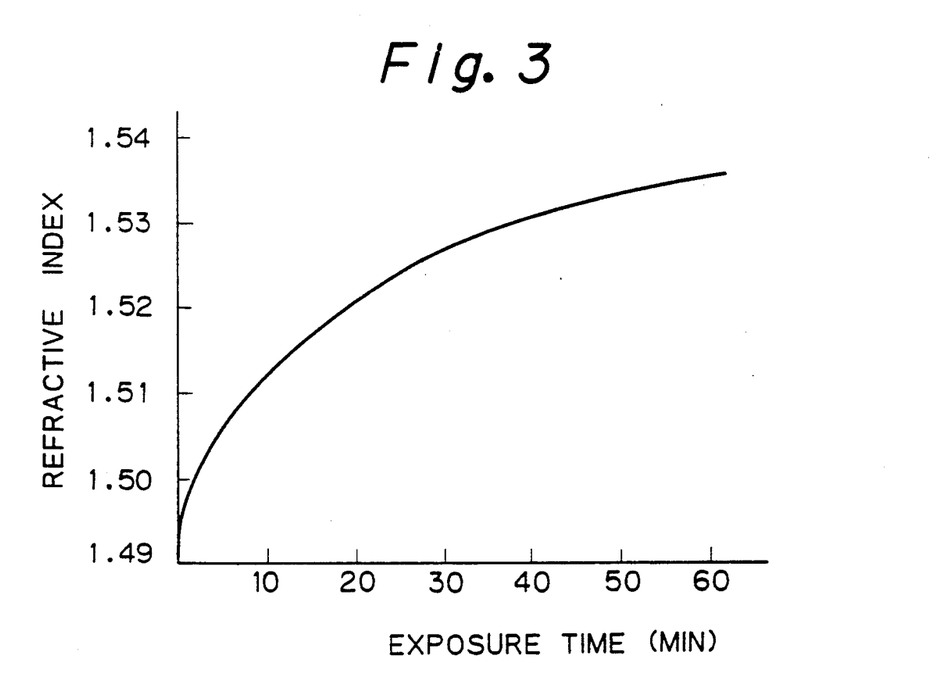
FIG. 3 shows a relationship of the refractive index and the exposure time to an ultra-violet.

Further, the concentration of the dopant (polyvinylcarbazole) in the matrix (acrylic polymer) and thus the refractive index of the layer, can be controlled by varying the exposure time of the layer of an ultra-violet ray. FIG. 3 shows a relationship between the refractive index and the exposure time to an ultra-violet ray, in which a mixture of 30% vinylcarbazole monomer with the remainder being an acrylic polymer was coated on a substrate, pre-baked and then exposed to an ultra-violet ray for various times and the refractive index of the cured layer was determined. The method of preparing the layer and the method of measuring the refractive index are substantially the same as described above.

As seen in FIG. 3, as the exposure time is prolonged, the refractive index is increased and then saturated after an exposure time of 50 to 60 minutes. The refractive index, of course, corresponds to the degree of the polymerization reaction. Thus, FIG. 3 suggests that the refractive index of the layer may be controlled by selecting the exposure time based on this curve, and removing the remaining monomer.

Figure 4:
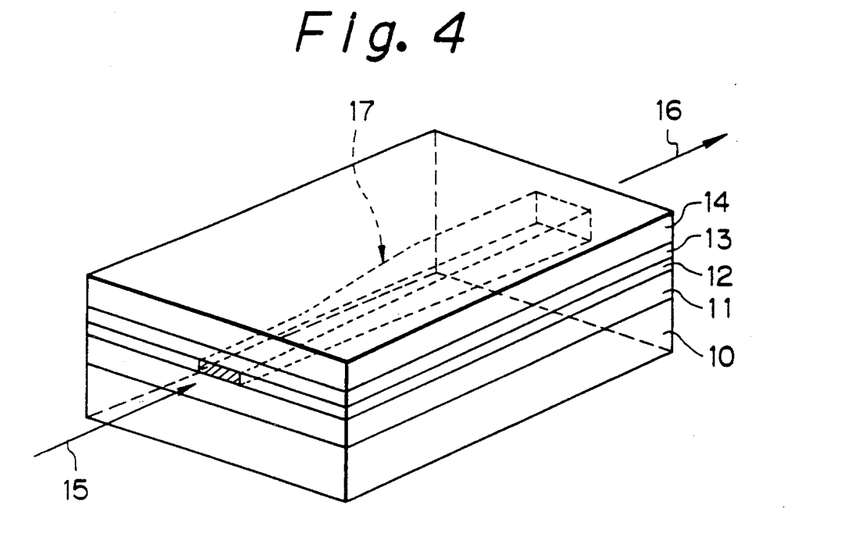
FIG. 4 shows a perspective view of an optical beam profile transforming element of the present invention.

FIG. 4 illustrates an example of an optical beam profile transforming element, in which 10 denotes a substrate (5 mm by 10 mm, 0.5 mm thick), 11 a lower clad layer (5 μm thick), 12 a first wave guide layer (1.5 μm thick), 13 a second wave guide layer (3.5 μm thick), 14 an upper clad layer (5 μm thick), 15 an incident light, 16 an emitting light and 17 a wave guide.

The lower and upper clad layers 11 and 14 have a refractive index of 1.49.

Figure 5A:
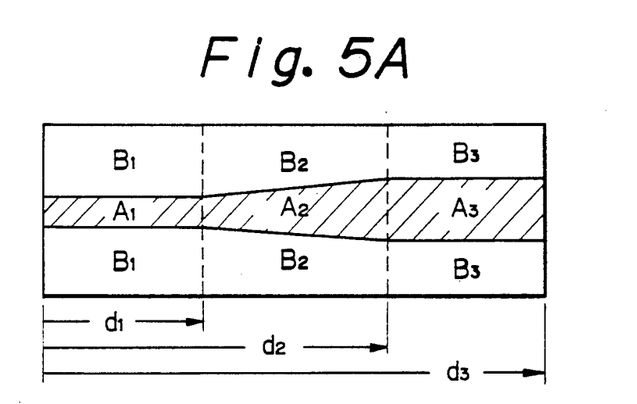
FIG. 5A and 5B are plan vies of first and second wave guide layers.

FIG. 5A is a plan view of the first wave guide layer 12 where the areas $A_1$, $A_2$, $A_3$, $B_1$, $B_2$ and $B_3$ are made to have respective refractive indexes, the areas $A_1$, $A_2$ and $A_3$ forming the wave guide portion 17 and the areas $B_1$, $B_2$ and $B_3$ forming a clad portion. The areas $A_1$, $A_2$ and $A_3$ have refractive indexes higher than those of the areas $B_1$, $B_2$ and $B_3$, respectively. As seen in FIG. 5A, the wave guide portion 17 has a narrow light entrance $A_1$ 4 μm wide and a wide light exit $A_3$ 5 μm wide as well as a transitional area $A_2$ diverging from 4 μm to 5 μm. Among the areas $A_1$, $A_2$ and $A_3$, the area A has a highest refractive index of 1.53, the area $A_3$ has a lowest refractive index of 1.50 and the area $A_2$ has a transitional refractive index gradually decreasing from 1.53 at the end adjacent to the area A to 1.50 at the other end adjacent to the area $A_3$. Among the areas $B_1$, $B_2$ and $B_3$, the area $B_1$ has a highest refractive index of 1.52, the area $B_3$ has a lowest refractive index of 1.49 and the area $B_2$ has a transitional refractive index gradually decreasing from 1.52 at the end adjacent to the area $B_1$ to 1.49 at the other end adjacent to the area $B_3$.

Figure 8:
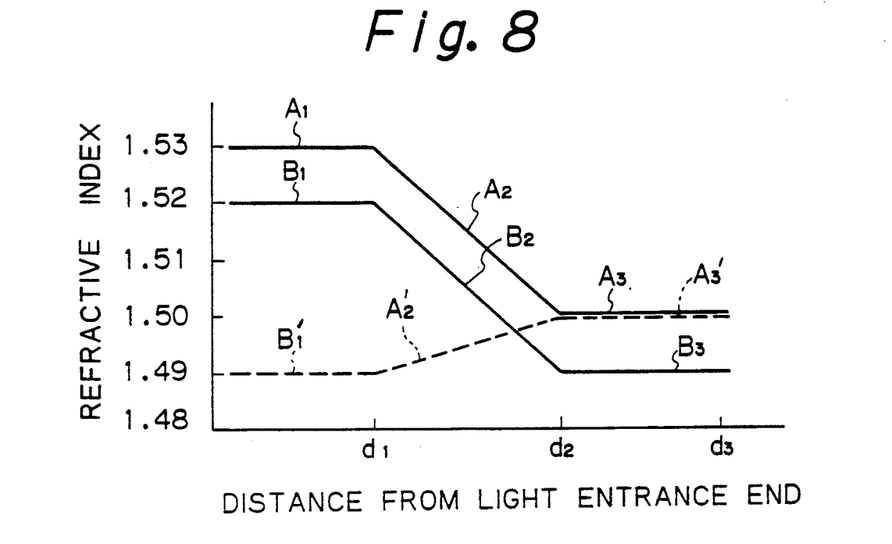
FIG. 8 shows the refractive indexes of various portions of the optical beam profile transforming element.
Figure 9:
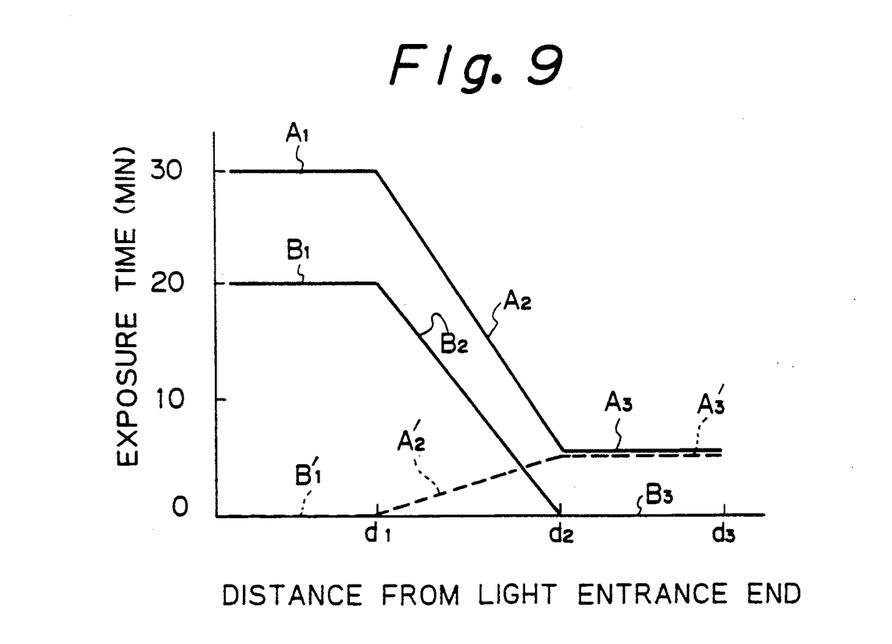
FIGS. 9 shows the exposure time for forming the variation of the refractive index of the optical beam profile transforming element.

The refractive index of a cladding portion is selected as below: For simplicity, one dimentional wave guid is explained. If a core portion having a thickness 2T is sandwiched by cladding portions, the normalized frequency $v$ of a propagating light is defined by the formula:

$$v^2 = \left(\frac{2\pi}{\lambda}\right)^2 (n_{core}^2 - n_{cladding}^2)T^2$$

where $\lambda$ is a wave length of the propagating light, $n_{core}$ is a refractive index of the core portion, and $n_{cladding}$ is a refractive index of the cladding portion. To obtain a single mode beam, $v$ should be less than $\pi/2$, i.e., $\lambda < \pi/2$. Therefore, it $v$ is constant, it is necessary to make $Tn\sqrt{\Delta n}$ constant where n is $n_{core}$ and $\Delta n$ is $1n_{core} - n_{cladding}$ 1. The refractive index of the area $B_3$ is 1.49, the same as that of the clad layers 11 and 14 because the core portion $A_3$ and $A_3'$ is squar. The refractive index of the area $A_1'$ is 1.49 the same as that of the upper clad layer 14. The refractive index of the areas $A_3$ and $A_3'$ is selected by the above formula and is 1.50. The refractive index of the areas $B_1$ and $B_2$ is selected to have same difference 0.01 of the refractive index from that of the adjacent core portions $A_1$ and $A_2$ as the difference of the refractive index between the areas $A_3$ or $A_3'$ and $B_3$ (see FIG. 8).

More details are described, for example, in the following publications, which are incorporated therein by reference.

1) E. A. J. Marcatili "Dielectric rectangular wave guide and directional coupler for integrated optics," Bell. Syst.Tech. J., Vol. 48, No. 7, pp.2071-2102, 1969.

2) J. E. Goel, "A circular-harmonic computer analysis of rectangular dielectric wave guides," Bell.Syst. Tech. J., Vol. 48 No. 7 pp.1131-1160, 1969.

Figure 5B:
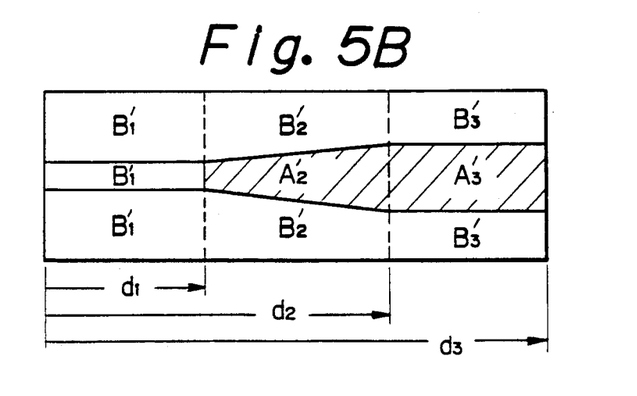

Similarly, FIG. 5B is a plan view of the second wave guide layer 13 where the areas $A_2'$, $A_3'$, $B_1'$, $B_2'$ and $B_3'$ are made to have respective refractive indexes, the areas $A_2'$ and $A_3'$ forming the wave guide region 17 and the areas $B_1'$, $B_2'$ and $B_3'$ forming a clad region. The areas $A_2'$ and $A_3'$ have refractive indexes higher than those of the areas $B_2'$ and $B_3'$, respectively. As seen in FIG. 5A, the wave guide region 17 has a transitional area $A_2'$ having a narrow end adjacent to the area $A_1$, 4 μm wide, to a wide end adjacent to the area $A_3'$, 5 μm wide, and a wide light exit $A_3'$, 5 μm wide. The area $A_1'$ has a refractive index of 1.49, the area $A_3'$ has a refractive index of 1.50, and the area $A_2'$ has a transitional refractive index gradually increasing from 1.49 at the end adjacent to the area $A_1'$ to 1.50 at the other end adjacent to the area $A_3'$.

Figure 6:
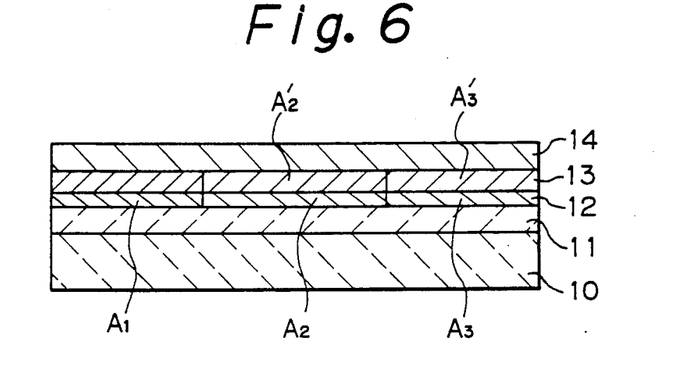
FIG. 6 is a vertical section of the optical beam profile transforming element FIG. 4.

FIG. 6 is a vertical sectional view of the optical beam profile transforming element of FIG. 4.

Figure 7A:
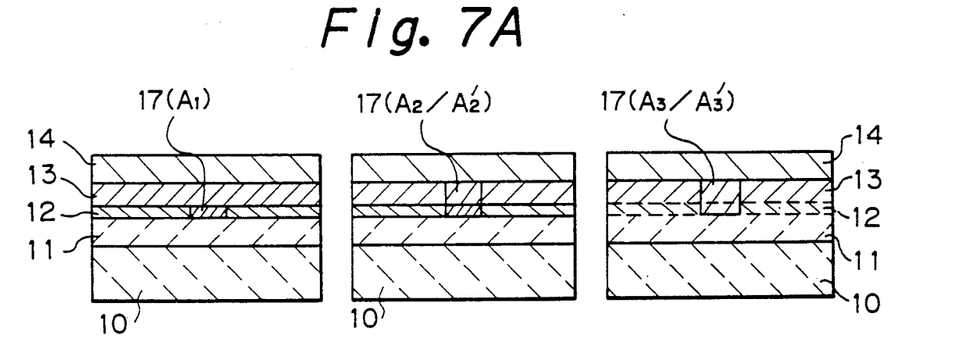
FIGS. 7A, 7B and 7C show cross sections, refractive indexes and beam profiles at the three portions of the optical beam profile transforming element.
Figure 7B:
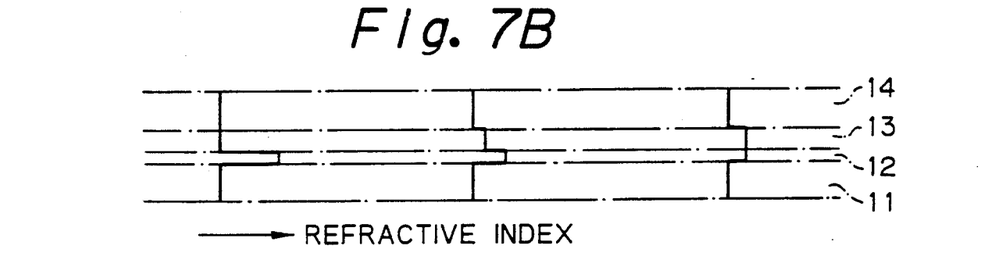
Figure 7C:
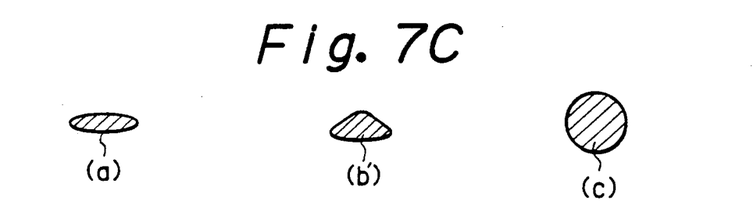

FIGS. 7A illustrates cross sections of the optical beam profile transforming element at the light entrance portion (corresponding to the area $A_1$), the transforming portion (corresponding to the area $A_2$ or $A_2'$) and the light emitting portion (corresponding to the area $A_3$ or $A_3'$), FIG. 7B illustrates refractive index profiles at the above respective portions, and FIG. 7C illustrates the beam profile at the above respective portions. At the light entrance portion, the wave guide portion 17 ($A_1$) is composed of the first wave guide layer 12 only and is rectangular in cross section. At the transforming portion, the wave guide portion 17 ($A_2/A_2'$) is composed of the first and second wave guide layers 12 and 13 and is square in cross section but the first wave guide layer 12 has a refractive index higher than that of the second wave guide layer 13, where a laser beam entering as an elapse beam (a) at the entrance is transformed to a profile (b') having a half ellipse-like profile in the first wave guide layer 12 and a half circular profile in the second wave guide layer 13. At the light emitting portion, the wave guide portion 17 ($A_3/A_3'$) is composed of the first and second wave guide layers 12 and 13 and is square in cross section, the first and second wave guide layers 12 and 13 having the same refractive index, where the beam entered as an ellipse beam (a) is emitted as a circular beam (c).

These refractive indexes of the various areas are shown in FIG. 8, in which the abscissa is the distance from the light entering end of the element, the solid lines show the refractive indexes of the first wave guide layer 12 and the broken line shows the refractive index of the second wave guide layer 13. The areas $A_1$, $B_1$ and $B_1'$ are defined by the distance from 0 to $d_1$, the areas $A_2$, and $B_2$, $A_2'$ and $B_2'$ are defined by the distance from $d_1$ to $d_2$, and the areas $A_3$, $B_3$, $A_3'$ and $B_3'$ are defined by the distance from d2 to $d_3$.

In summary, the optical beam profile transforming element has a construction characterized as follows. At the light incident side of the element, the wave guide or core 17 has a cross section having a thickness of that of the first wave guide layer 12, i.e., 1.5 μm, and a width of the area $A_1$, i.e., 4 μm and has a high refractive index of 1.53. At the light exit side of the element, the wave guide or core 17 has a cross section having a thickness of the total of the first and second wave guide layers 12 and 13, i.e., 5 μm and a width of the areas $A_3$ or $A_3'$, i.e., 5 μm and has a low refractive index of 1.50. At the transitional portion of the element corresponding to the areas $A_2$ and $A_2'$, the wave guide or core 17 has a width gradually diverging from 4 μm, the width of the area $A_1$, to 5 μm, the width of the areas $A_3$ and $A_3'$, and has a constant thickness of the total thickness of the first and second wave guide layers 12 and 13, i.e., 5 μm. However, at this transitional portion, the wave guide or core 17 has a special refractive index. In the first wave guide layer, the refractive index varies and gradually decreases from 1.53, the same as that of the element at the light incident side, to 1.50, the same as that of the element at the light emitting side. In the second wave guide layer 13, the refractive index varies and gradually increases from 1.49, the same as that of the clad layer 14, to 1.50, the same as that of the element at the light emitting side. As a result, the wave guide 17 at the transitional portion functions as if it has an effective wave guide or core having a width gradually diverging from 4 μm to 5 μm and a thickness gradually diverging from 1.5 μm to 5 μm, so that a laser beam having an ellipse beam profile (a), 1.5 μm by 4 μm, is transformed to a circular beam profile (c) 5 μm diameter during the transmission through the element.

Thus, by the optical beam profile transforming element shown in FIG. 4, a laser beam having an ellipse profile can be transformed to a beam having a circular profile.

The manufacture of the optical beam profile transforming element shown in FIG. 4 is described below.

Figure 10A:
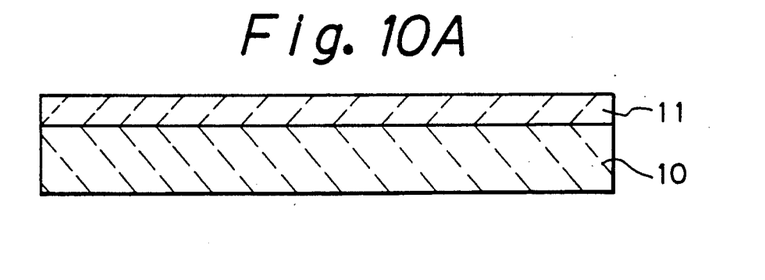
FIGS. 10A to 10D are cross sections of the optical beam profile transforming element during the main steps of the manufacturing the same.

Referring to FIG. 10A, on a flat substrate 10, for example, a silicon substrate, a lower clad layer 11 with a thickness of 5 μm is formed by spin-coating a solution of an acrylic polymer ("Optomer" provided by Nippon Synthetic Chemical Industries Ltd.) in Celfloacetate as a matrix on the substrate 10 and baking it at 150° C. for 30 minutes.

Figure 10B:
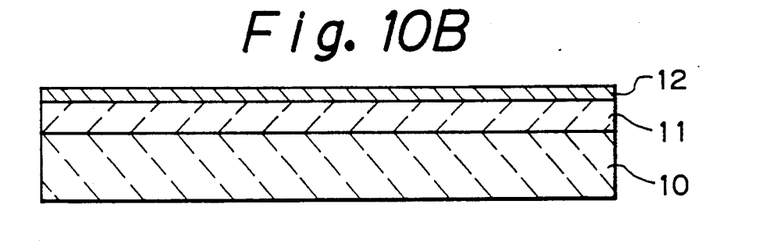

Referring to FIG. 10B, a first optically curable wave guide forming layer 12, (thickness of 1.5 μm) is formed by spin coating a 30 wt % solution of vinylcabazole monomer in an acrylic polymer as a matrix. The details of the formation of this layer 12' are as described before.

Referring to FIG. 5, a portion of the first optically curable wave guide forming layer 12' where a wave guide is to be formed, the areas $A_1$, $A_2$ and $A_3$, is irradiated with an ultra-violet ray. For example, an exposure mask having an opening for the areas $A_1$, $A_2$ and $A_3$ is placed on the layer 12 and an ultra-violet ray is irradiated with for a predetermined time to polymerize the vinylcarbazole monomer in the areas $A_1$, $A_2$ and $A_3$ of the layer 12' and form polyvinylcarbazole. The amount of the irradiation of the UV-ray can be gradually varied depending on areas by moving a photo mask to adjust the time of exposure. Alternatively, a photo mask having a UV-ray permeation different depending on areas may be used to gradually vary the amount of the UV-imadiation. The exposure times for the areas $A_1$, $A_2$ and $A_3$ as well as the areas $B_1$, $B_2$ and $B_3$ are shown in FIG. 8. In FIG. 8, the abscissa is the distance from the light entering end of the element. The irradiated layer 12' is then immersed in a solvent for removing the monomer, for example, ethyl alcohol at the room temperature to solve and remove the remaining unreacted vinylcarbazole from the layer 12'. The layer 12' is post backed at 150° C. for 30 minutes to form a first wave guide layer 12. By the exposure time schedule as shown in FIG. 8, the profile of the refractive index as shown in FIG. 7 is obtained.

Figure 10C:
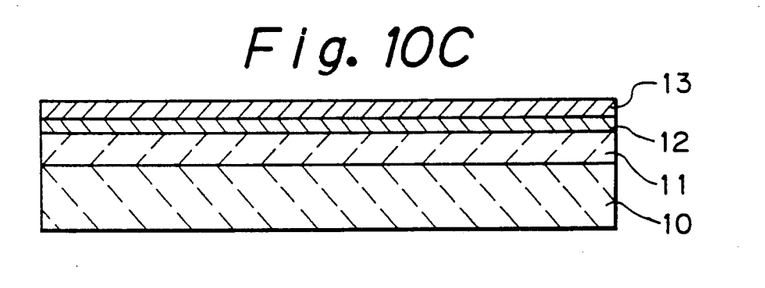

Referring to FIG. 10C, a second wave guide forming layer 13' is formed on the first wave guide layer 12 in the same manner as for the first wave guide forming layer 12' and the thickness of the second wave guide forming layer 13' is 3.5 μm.

Referring to FIG. 6, a portion of the second optically curable wave guide forming layer 13' where a wave guide is to be formed, the areas $B_2$ and $B_3$, is irradiated with an ultra-violet ray for a predetermined time, to polymerize the vinylcarbazole monomer in the areas $B_2$ and $B_3$ of the layer 13' and form polyvinylcarbazole. The details may be as described above for the first wave guide layer 12. The exposure time periods for the areas $A_2'$ and $A_3'$ as well as the areas $B_1'$, $B_2'$ and $B_3'$ are shown in FIG. 8 and by the exposure time schedule, the profile of the refractive index as shown in FIG. 7 is obtained. Thus, a second wave guide layer 13 is formed.

Figure 10D:
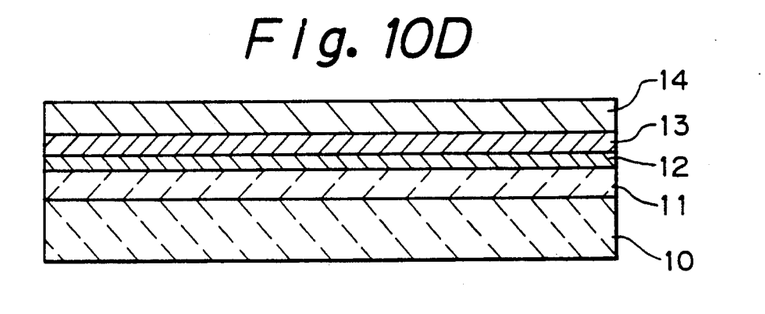

Referring to FIG. 10D, a second clad layer 14 with a thickness of 5 μm is formed by coating a solution of an acrylic polymer in Cerfloacetate on the second wave guide layer 13 and baking at 150° C. for 30 minutes, in the same manner as described for the first clad layer 11.

Thus an optical beam profile transforming element is manufactured. By this element, a laser beam emitted from a semiconductor laser, 1.4 μm by 4 μm diameter, can be transformed with a very low loss and can be coupled and propagated into an optical fiber having a diameter of 8 μm at a high efficiency.

Note that the substrate 10 may be any one which is flat and has a smooth surface. The upper clad layer 14 may be optionally omitted, and the lower clad layer 11 may be optionally omitted when the substrate 10 is transparent to the propagating light.

Further, if the ratio of the transformation is larger and the first and second wave guide layers 12 and 13 are not sufficient, third or further wave guide layers may be formed to form the larger light exit. For example, as shown in FIGS. 11A and 11B, a third wave guide layer 16 or 17 having a transitional portion with a refractive index gradually increasing from the light entrance side to the light exit side as the second wave guide layer 13 may be inserted between the second wave guide layer 13 and the upper clad layer 14, or between the lower clad layer 11 and the first wave guide layer 12. Alternatively, the order of the first and second wave guide layers 12 and 13 may be reversed and in a third case, a third wave guide layer 18 may be also formed on the first wave guide layer 12, if necessary.

We claim:

1. An optical beam profile transforming element having a direction of light propagation, which comprises at least two parallel plastic wave guide layers in contact with each other, each of said at least two parallel plastic wave guide layers having a refractive index gradually varying in the direction of light propagation such that said at least two parallel plastic wave guide layers as a whole transform a profile of an optical beam in the direction vertical to the layers.

2. An optical beam profile transforming element comprising at least first and second parallel plastic wave guide layers, the first parallel plastic wave guide layer having a first wave guide portion and a first clad portion, the second parallel plastic wave guide layer having a second wave guide portion and a second clad portion, the first and second wave guide portions being in contact with each other and composing a wave guide having a direction of light propagation, each of the first and second wave guide portions having a refractive index gradually varying in the direction of light propagation such that the first and second parallel plastic wave guide layers as a whole transform a profile of an optical beam in the direction vertical to the layers during light propagation through the wave guide.

3. An optical beam profile transforming element according to claim 2 wherein the first wave guide portion has a refractive index gradually decreasing from a first refractive index at a first end to a second refractive index lower than the first refractive index at a second end in the direction of light propagation, the second wave guide portion has a refractive index gradually increasing from a third refractive index lower than the second refractive index at the first end to the second refractive index at the second end in the direction of light propagation, so that the wave guide has a first cross section composed of a cross section of the first wave guide portion at the first end and a second cross section composed of cross sections of the first and second wave guide portions at the second end.

4. An optical beam profile transforming element according to claim 3, wherein the first cross section is rectangular and the second cross section is square, whereby a laser beam having an ellipse profile entered to the wave guide at the first end can be transformed to a circle profile emitting at the second end.

5. An optical beam profile transforming element according to claim 3, further comprising a third wave guide portion in contact with one of the first and second wave guide portions, the third wave guide portion having a refractive index gradually increasing from the third refractive index at the first end to the second refractive index at the second end in the direction of light propagation, so that the wave guide has a first cross section composed of a cross section of the first wave guide portion at the first end and a third cross section composed of cross sections of the first, second and third wave guide portions at the second end.

6. An optical beam profile transforming element according to claim 2, wherein the wave guide portions comprise a polymer matrix and a dopant having a refractive index higher than that of the matrix and said variation of the refractive index of each of the wave guide portions is formed by a variation of a concentration of the dopant in the wave guide portions.

7. An optical beam profile transforming element according to claim 6, wherein the matrix is polyacrylic polymer and the dopant is polycarbazole.

8. An optical beam profile transforming element according to claim 2, wherein said wave guide layers are formed on a substrate and a lower clad layer is provided between the substrate and the wave guide layers.

9. An optical beam profile transforming element according to claim 2, further comprising an upper clad layer on the wave guide layers.

10. An optical beam profile transforming element according to claim 2, wherein said first and second wave guide portions have a width in the direction of said layers, said width of the wave guide portions being varied in the direction of wave propagation so that the profile of the propagated optical beam is transformed in directions both perpendicular to and in parallel with said layers during light propagation through the wave guide.

* * * * *

UNITED STATES PATENT AND TRADEMARK OFFICE
CERTIFICATE OF CORRECTION

PATENT NO. : 5,175,788
DATED : December 29, 1992
INVENTOR(S) : KAZUNORI MIURA and IPPEI SAWAKI It is certified that error appears in the above-identified patent and that said Letters Patent is hereby corrected as shown below:

TITLE PAGE [54] IN THE TITLE "TRANFORMING" should be
and COLUMN 1, --TRANSFORMING--.
Line 1

[56] <u>Assistant Examiner</u> "Heartne" should be
    --Heartney--.

Column 2, line 65, "form" should be --from--.

Column 3, line 13, "a" should be --at--;
         line 26, "FIG." should be --FIGS.--, "vies"
              should be --views--;
         line 35, "FIGS." should be --FIG.--.

Column 5, line 2, "A" should be --$A_1$--;
         line 6, "A" should be --$A_1$--;
         line 14, "simplisity" should be
              --simplicity--, "guid" should be --guide--;
         line 29, "$\nu$is" should be --$\nu$ is--;
         line 33, "squar" should be --square--;
         line 34, after "1.49" insert a comma --,--;
         line 50, after "48" insert a comma --,--, after
              "7" insert a comma --,--.

Column 6, line 1, "FIGS." should be --FIG.--;
         line 36, "d2" should be --$d_2$--.

Column 7, line 35, "imadiation" should be --irradiation--;

UNITED STATES PATENT AND TRADEMARK OFFICE
CERTIFICATE OF CORRECTION

PATENT NO. : 5,175,788

DATED : December 29, 1992

INVENTOR(S) : KAZUNORI MIURA and IPPEI SAWAKI

It is certified that error appears in the above-identified patent and that said Letters Patent is hereby corrected as shown below:

Column 7, line 42, "backed" should be --baked--.

Signed and Sealed this

Second Day of November, 1993

Attest:

BRUCE LEHMAN

Attesting Officer

Commissioner of Patents and Trademarks